(No Model.) 3 Sheets—Sheet 3.
H. DRESES & W. BARKER.
WORK HOLDING DEVICE FOR LATHES.
No. 546,311. Patented Sept. 17, 1895.
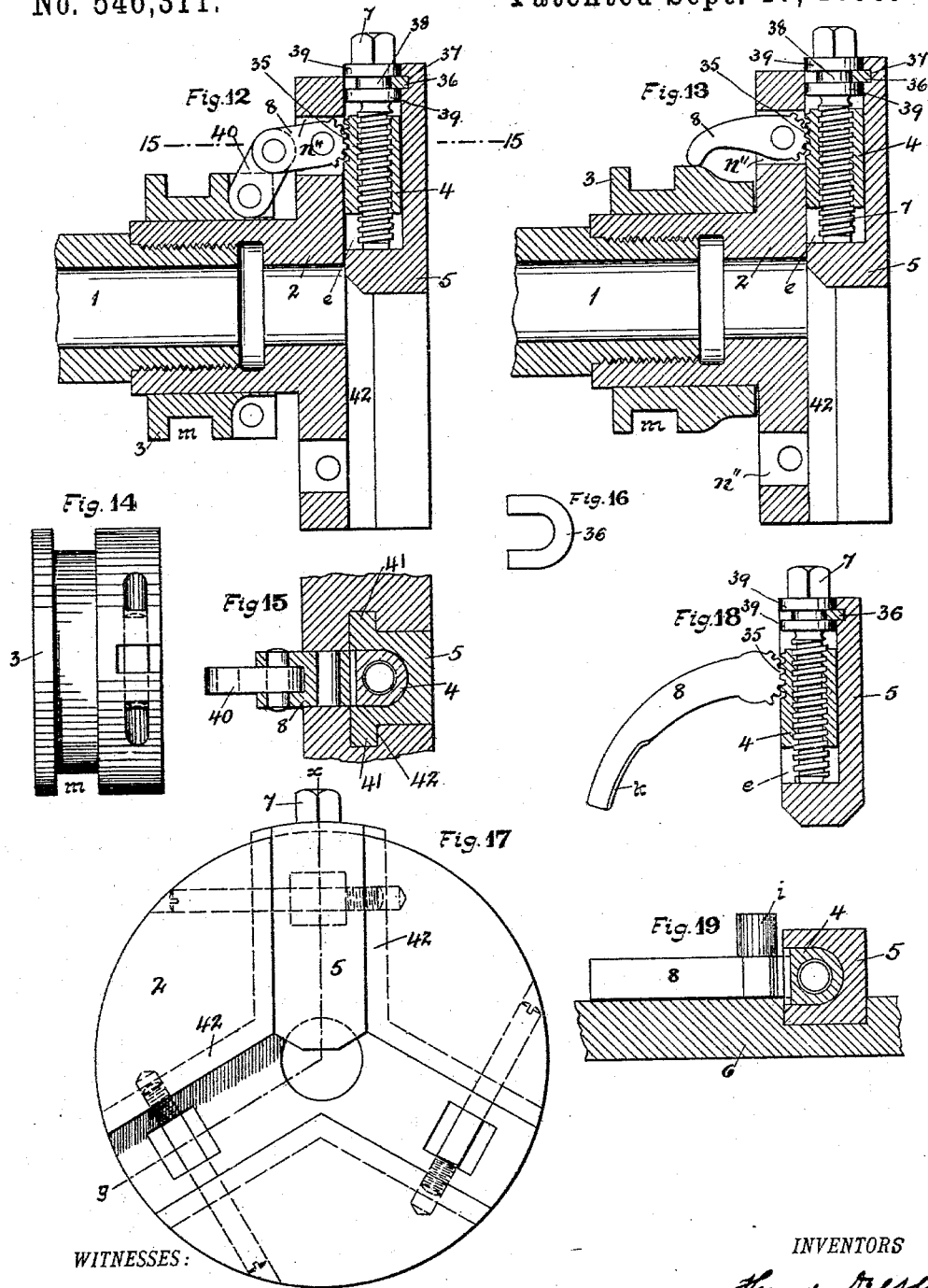

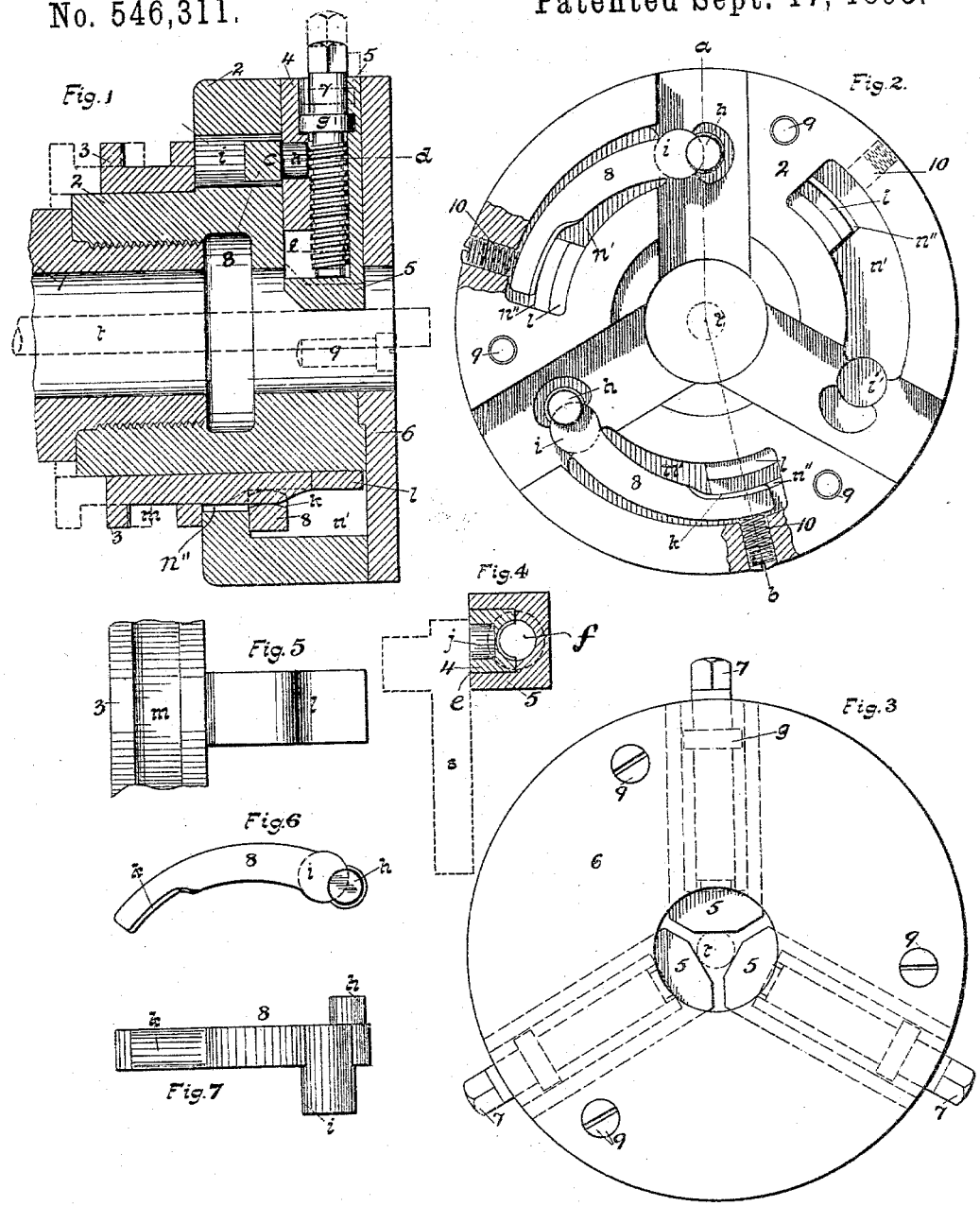

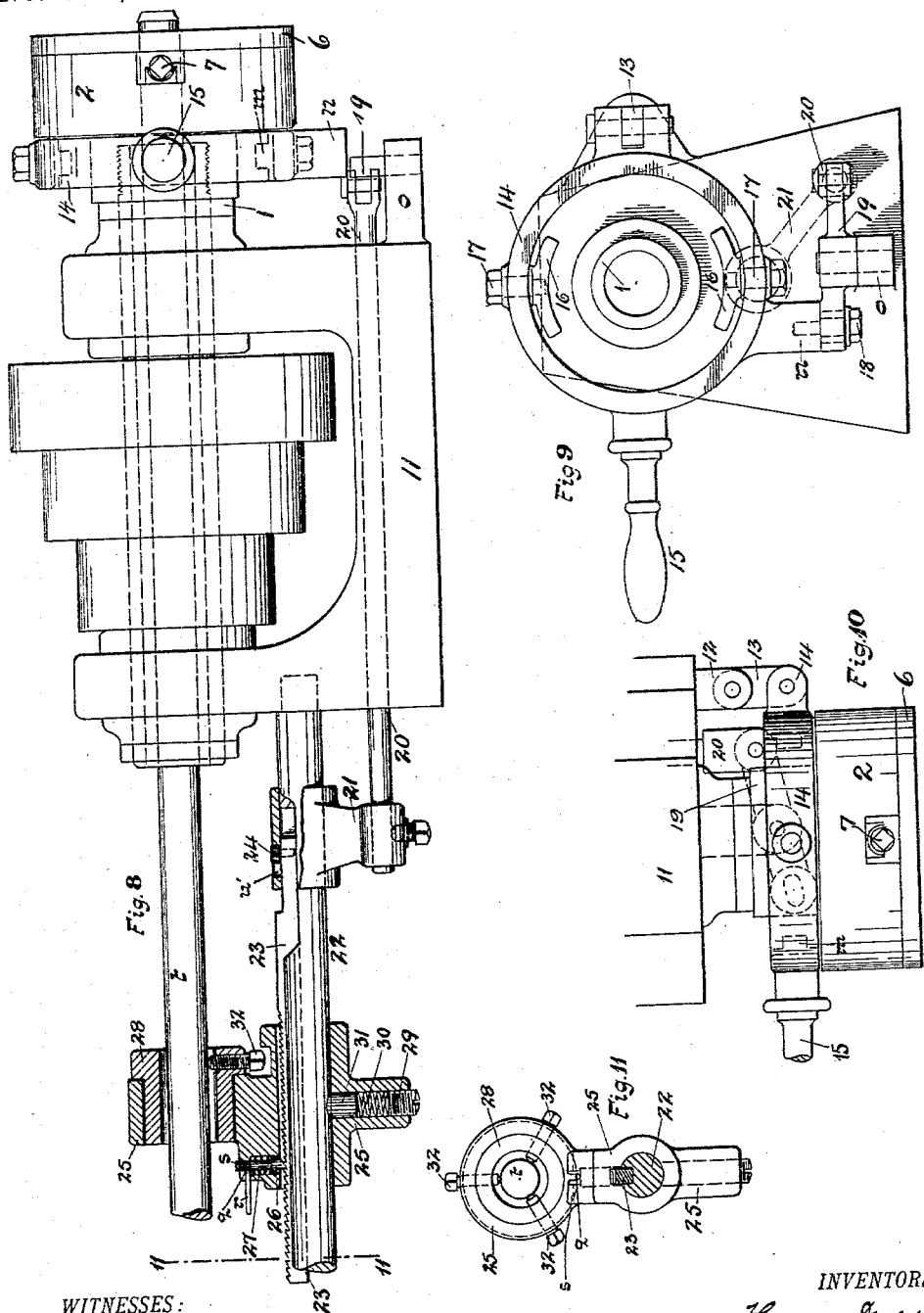

UNITED STATES PATENT OFFICE.

HENRY DRESES, OF CINCINNATI, OHIO, AND WILLIAM BARKER, OF NEWPORT, KENTUCKY.

WORK-HOLDING DEVICE FOR LATHES.

SPECIFICATION forming part of Letters Patent No. 546,311, dated September 17, 1895.

Application filed December 19, 1894. Serial No. 532,316. (No model.)

*To all whom it may concern:*

Be it known that we, HENRY DRESES, residing at Cincinnati, Hamilton county, State of Ohio, and WILLIAM BARKER, residing at Newport, Campbell county, State of Kentucky, citizens of the United States, have invented new and useful Improvements in Work-Holding Devices for Lathes or Similar Machines; and we do declare the following to be a full, clear, and exact description of the invention, such as will enable others skilled in the art to which it appertains to make and use the same, attention being called to the accompanying drawings, with the reference letters and numerals marked thereon, which form a part of this specification.

Our invention relates to improvements in work or stock holding and feeding devices for screw-machines, lathes, milling-machines, &c., where such devices are used for the purpose of rotating the work against a tool which acts upon and shapes such work during its rotation.

The improvements pertain more particularly to screw-cutting lathes where a long bar of iron is held and rotated by a chuck and worked up in screws. After a screw of a certain length has been completed it is cut off from the bar, the latter is advanced, and another screw is finished, and so on successively until the whole length of the bar is used up, after which another one may be inserted. In such lathes the chuck and workholding parts are usually so constructed as to permit the work to be released after a screw is finished, advanced for the next one, and grasped again for cutting, all while the machine is running and the chuck rotating, without requiring any of the parts to be stopped.

The features of our invention relate to the general and specific construction of certain parts to be explained hereinafter and to a mechanical connection between the means for adjusting the work-grasping jaws of the chuck and the mechanism which feeds the stock forward, whereby these parts are caused to act and operate together.

In the following specification, and particularly pointed out in the claims at the end thereof, is found a full description of our invention, its operation, parts, and construction, which latter is also illustrated in the accompanying three sheets of drawings, in which—

Figure 1 is a longitudinal section of the chuck, taken on line $a\ b$ of Fig. 2. Fig. 2 is an end view of it with certain parts removed. Fig. 3 is also an end view, but showing the chuck complete with the gripping-jaws in position. Fig. 4 is a cross-section of one of the jaws, taken on a line $c\ d$ of Fig. 1. Fig. 5 is a detail view showing a portion of the pronged collar 3. Figs. 6 and 7 are elevations at right angles of lever 8. Fig. 8 shows in side elevation the chuck in position on the spindle of a lathe-head and operatively connected to the stock-feeding mechanism. Fig. 9 is an end view of the lathe-head shown in the preceding figure with the chuck removed. Fig. 10 is a top view of a part of Fig. 8, showing the front end of the lathe-head with the chuck in position and the mechanism whereby it is adjusted. Fig. 11 is a section on line 11 11 of Fig. 8. The following figures show modified constructions of some of the parts shown in the preceding figures and will be fully understood when considered in connection with the description of the parts in the specification. Figs. 12 and 13 are longitudinal sections of the chuck on line $x\ y$ of Fig. 17, similar to Fig. 1. Figs. 14, 15, and 16 are detail views of Fig. 12, Fig. 15 being a section on line 15 15 thereof. Fig. 17 is a front view of the chuck as shown in Fig. 12. Figs. 18 and 19 are elevations, partly in section and at right angles to each other, showing levers 8 and their operative connection to jaws 5. Figs. 8, 9, 10, and 11 are shown on a smaller scale than the other figures.

In the drawings, 2 represents the chuck-body, hollow throughout its center and arranged to fit upon the end or nose of the hollow lathe-spindle 1. The front face of this chuck is radially grooved to receive the jaws 5, which are kept in place by the cap or faceplate 6, which is secured against the front face of the chuck by screws 9 and closes the grooves therein. These jaws are recessed, as shown at $e$, in a manner to be capable to receive blocks 4, which latter, as well as jaws 5, are further bored out cylindrically in a manner that one-half of such bore is contained in block 4, the other in jaw 5, as shown at $f$ in Fig. 4, the size of the complete bore being sufficient to receive and fit screws 7. That part of the bore contained in blocks 4 is screw-threaded and in engagement with screws 7, while the other part of the bore within jaws 5 is smooth and not capable of being acted upon by the thread of screws 7. Such jaws are, however, otherwise operatively connected to screws 7 by means of a collar $g$ on the latter, half of which occupies a corresponding recess cut within the half-cylindrical bore of the jaws. (See Fig. 1.) Blocks 4 do not have such recess, but are bored out clear through above collar $g$ on a diameter which is large enough to permit the latter to move up and down therein without in any way acting upon block 4. The effect of this construction is that if block 4 is held immovably in position and screw 7 is turned the former will become a fixed nut to the latter, which latter—that is, screw 7—will move in or out on it, according to the direction in which it is turned. In this longitudinal movement it carries with it jaw 5 by reason of the latter's engagement with collar $g$ of the former, so that these two parts—that is, screws 7 and jaws 5—move always together and do not change their position longitudinally on each other. During such movement nuts 4 remain perfectly stationary and are not affected by either the rotary or longitudinal movement of screws 7. The fixed position of these semicircular nuts 4 is obtained by means of pivots $h$, extending out from and forming part of levers 8 (see Fig. 7) and passing into sockets $j$ on the former. Said levers are in turn supported on pivots $i$, extending in a direction opposite to pivots $h$ and occupying cavities $i'$ in the body of the chuck. (See Fig. 2.) These levers occupy spaces $n'$, cut also out of the body of the chuck, which spaces are of sufficient size to allow them a limited swinging movement in a plane parallel to the face of the chuck and at right angles to the spindle thereof. Pivots $h$ and $i$ on the levers are not in line, but excentric to each other, (see Fig. 7,) from which it follows that if said levers swing on their pivots $i$, pivots $h$ will also move and act upon blocks or nuts 4 in a manner to cause them to slide radially on the chuck. The former statement, therefore, describing the position of nuts 4 as fixed, is not strictly correct and must be modified in view and to the extent of the motion they receive from pivots $h$ of levers 8; but they are fixed with reference to screws 7 and jaws 5, because these latter two are movable on them independently from the movement imparted by levers 8. It will thus be seen that jaws 5 are capable of being adjusted in a twofold way—first, in a more extended range by means of screws 7 on nuts 4, which are then in a fixed position, and, second, to a limited extent by means of levers 8, which act upon them through the intervention of nuts 4 and screws 7, nuts 4 remaining then not stationary any more, but moving with pivots $h$. In this last event, then, all three members 4, 7, and 5 move radially together.

The movement of levers 8 is obtained from prongs 1, one for each lever, forming part of a flanged collar 3 and passing in rearwardly under the free or tail ends of said levers through openings $n''$, cut clear through the chuck. Collar 3 surrounds the hub of the chuck and is adjustably supported thereon. The front ends of these prongs are partly inclined or wedge-shaped, as most plainly shown in Fig. 1, the resulting difference in their thickness producing the movement of the levers as either their thinner or thicker part engages with them. The effect of this construction and its operation will now be readily understood and is as follows: The work-stock or iron bar $t$, in this case to be cut up into screws and indicated by dotted lines in Figs. 1, 2, and 3, is inserted within the hollow bore of the lathe-spindle and chuck, the end to be acted upon by the lathe-tool projecting beyond the face of the chuck, and, with a position of collar 3 and levers 8 as shown in Figs. 1 and 2, jaws 5 are now screwed down by screws 7 and the work is tightly grasped. After a screw is finished and cut off and the bar is ready to be fed forward for the next one ring 3, with prongs, 1 is moved outwardly, as shown by dotted lines in Fig. 1, whereupon springs 10 press the free ends of levers 8 inwardly, with the effect of carrying jaws 5 away from the work and releasing the same. After the latter is sufficiently fed forward ring 3 is moved inwardly again, which causes the free ends of levers 8 to ride up on the inclined surfaces of prongs 1, with the final result of jaws 5 moving inwardly against the work and grasping it once more. To facilitate the sliding movement between prongs 1 and levers 8 the rear ends of these latter are rounded off, as shown at $k$.

The movement of collar 3 is obtained by means of a ring 14, pivotally supported by a link 13 on a lug 12, projecting from the front of head-stock 11, which carries the bearings for the lathe-spindle. The collar is operatively connected to this ring by shoes 16, swiveling on the latter, to which they are pivotally secured, and taking into the annular groove $m$ formed between the flanges on collar 3.

Ring 14 is provided with a handle 15 for manipulation, and it is evident that if operated for the purpose of sliding collar 3 in or out on the lathe-spindle shoes 16 move the former on the latter longitudinally and adjust themselves in groove $m$ without interfering with the rotation of either collar or chuck. To ring 14 is also operatively connected the feed mechanism whereby the work is fed forward, and whereby this mechanism is operated simultaneously with and by the same means whereby jaws 5 are operated. This connection commences with a lever 19, pivotally supported on a bearing $o$, also projecting from the front of head-stock 11, and connected with one end to ring 14 by means of a lug $n$, depending from the latter, and its other end secured to a rod 20. The effect of this construction is that the movement of ring 14 causes lever 19 to oscillate, as well as rod 20 to move longitudinally. This latter passes rearwardly through head-stock 11, by which it is guided, and carries at its rear end an arm 21, the free end of which embraces a guide-bar 22, suitably supported. This latter is grooved in its upper surface, (see Fig. 11,) which groove is occupied by a rack 23, connected by means of a screw 24 to that part of arm 21 which embraces guide-bar 22, Fig. 8. It will now be understood that if ring 14 is moved for the purpose of adjusting jaws 5 it will also at the same time, by means of lever 19, move rod 20, with arm 21 and rack 23.

Further supported on guide-rod 22 is a customary feed-block 25, kept from turning thereon by rack 23, which reaches partly up into its hub, said feed-block carrying loosely in its upper part a bush 28, which is substantially centrally in line with the lathe-spindle. This bush carries screws 32, whereby the work or iron bar is held and caused to feed forward when the feed mechanism operates, while otherwise the loose connection of bush 28 does not interfere with the rotation of the work imparted to it by the chuck and going on while the thread is being cut on the screw under completion. Feed-block 25 also carries a pawl 26, held in engagement with rack 23 by a spring 27. Its shape and the shape of the rack-teeth is such that when the rack moves outwardly it will not affect the feed-block, but when moving inwardly it will engage the pawl and cause the feed-block, with bush 28 and the work $t$ held by the latter, to move also inwardly, or toward the chuck. $r$ is a pin guided in a slot $q$, and prevents the round pawl from turning, serving also as a handle to lift the latter out of contact with the rack when the service of the feed mechanism is not required. To hold the pawl out of such contact, handle $r$ is turned as soon as out of slot $q$ and passed into a shallow groove $s$, which runs at right angles to slot $q$.

30 is a friction-spring pressing, by means of a plug 31, carried in feed-block 25, against guide-bar 22, the object being to provide sufficient frictional resistance to prevent the feed-block from being affected when rack 23 moves through it outwardly, at which time the feed-block is not intended to move.

The operation of the whole machine is now, in short, as follows: The stock or iron bar $t$ to be cut up in screws is passed in through bush 28, through the lathe-spindle, and through between jaws 5 of the chuck, beyond which latter it projects sufficiently to accommodate the length of the screw to be presently made. Handle 15 is pushed forward, or to the right in Fig. 8, to cause the thicker part of prongs 1 on collar 3 to move under levers 8, which brings jaws 5 inwardly on the chuck to the extent of the movement of the short end of levers 8. The inward movement of jaws 5 is now continued by means of screws 7, by which latter they are set down close against the work and the latter is firmly grasped. Screws 32 in the bush of the feed-block are also tightened on the work, and the latter is now ready to be rotated by the lathe-spindle, bush 28 revolving with it and within feed-block 25. After a screw is finished and cut off handle 15 is moved to the left in Fig. 8, whereupon ring 14 moves collar 3 out from the chuck, bringing the thinner parts of prongs 1 under levers 8, the tail ends of which are then thrown inwardly by springs 10, and jaws 5 move away from the work and release it. At the same time rack 23 moves also, by reason of arm 21, rod 20, and lever 19, and acts on the pawl of the feed-block, which now advances with bush 28 and feeds the stock or bar $t$ forward, when, after this handle 15 is moved to the right again, the feed-rack moves again, but in opposite direction, and slides through the hub of the feed-block, which this time remains stationary, its pawl being not affected by reason of the shape of the ratchet-teeth on the rack. At the same time jaws 5 close again down on the work and grasp it, without requiring now any additional tightening by means of screws 7. When the work is released first to be fed forward, jaws 5 should open slightly in advance before the feed motion starts, because the stock cannot feed forward until completely released from the jaws. This variation in the starting of the two motions—that is, the motion of the opening jaws and the feed motion—is obtained by making the connection between the devices which perform said motions not rigid. As the preferable way we provide a slot $u'$ in the hub of arm 21, the length of which the head of screw 24 has to traverse first before the motion from ring 14 is transmitted to rack 23.

In Figs. 12 to 19 modified constructions are shown which may be connected to and used with the feed mechanism, showing also other minor changes in details, which will be presently explained.

In Figs. 12, 14, 15, 16, and 17 the ends of levers 8, wherever shown, are provided with segmental pinions 35, which engage with rack-teeth formed on the outside of nuts 40. These latter are solid in this case—that is, they completely surround screws 7, connection between the latter and jaws 5 being accomplished by a half-ring 36, (shown separate in Fig. 16,) which partly rests in a groove 37 in the recess of the jaws and partly in another groove 38, formed by flanges 39 on screws 7. Connection with ring 3 is obtained by a toggle-joint, of which these levers 8 form one member, the other members being formed by links 40, which are hinged to said collar, from which prongs 1 are omitted in this case. Face-plate 6 is also done away with and jaws 5 are provided with flanges 41, which fit into and slide in grooves 42 in the chuck.

The construction in Fig. 13 is almost the same, with the exception that in place of the toggle-joint connection levers 8 slide directly upon collar 3, the front end of which is tapering.

In Figs. 18 and 19 the original lever 8 is used again; but its connection to nut 4, as well as the latter and the connection of screws 7 to jaws 5, are the same as shown in Figs. 12 or 13. Jaws 5 are also supported as originally described and slide between the body of the chuck and a face-plate 6.

Having described our invention, we claim as new—

1. A lathe-chuck, provided with radial grooves in its face, jaws occupying these grooves, recessed at e and having grooves in said recesses, a sliding block 4, for each jaw, fitting the recess thereof, cylindrical bores passing longitudinally inwardly from the outer ends of the jaws and so located thereon as to have one half contained in the jaw, the other half being contained in the contiguous surface of the sliding block, screws 7, for these bores, engaging however only with that half thereof which is contained in blocks 4, which latter half is only threaded, a collar $g$ on each screw 7 in engagement with the grooves cut in the recessed part of the jaws whereby said screws are longitudinally confined on the jaws but may be rotated for adjusting the relative position between blocks and jaws and levers whereby the two may be adjusted together and independent of the adjustment between them.

2. A lathe-chuck provided with and adapted to support adjustable jaws, and having recesses $n'$ in its face, back of said jaws, and openings $n''$ in the bottom of said recesses, passing rearwardly clear through the body of the chuck, levers 8 connected to the jaws and pivotally supported in recesses $n'$ and located therein parallel to the face of the chuck and at right angles to the spindle thereof, a sliding collar on the hub of the chuck, having prongs 1, of unequal thickness, reaching through openings $n''$ into recesses $n'$ and passing under the tail-ends of levers 8 therein and springs opposing the action of prongs 1.

3. A lathe-chuck, or similar work-holding device, provided with radially movable jaws 5, recessed at $e$, nuts 4, contained in said recesses, screws 7, in engagement with the nuts, screws 7, and jaws 5, provided with grooves 38, and 37, respectively opposite each other, the former on screws 7, the other on jaws 5, a segmental ring 36, resting partly in each groove and connecting screws 7, to jaws 5, levers 8, pivotally supported on the chuck-body and operatively connected to nuts 4, and means to oscillate the levers.

4. A lathe-chuck, or similar work-holding device, provided with levers 8, pivotally connected thereto, nuts 4, supported by levers 8, screws 7, in engagement with said nuts, jaws 5, carried on the screws, a collar 3, loosely supported on the hub of the chuck and adapted to oscillate levers 8, a ring 14, pivotally supported and in engagement with said collar, a handle 15 on said ring to adjust it longitudinally for the purpose of acting upon levers 8, a customary feed-mechanism for advancing the work longitudinally and means whereby it is connected to ring 14, in a manner that when the latter is operated for the purpose of releasing the work from the jaws said feed-mechanism advances the work.

5. A lathe-chuck, or similar work-holding device, provided with levers 8, pivotally connected thereto, nuts 4, supported by levers 8, screws 7 in engagement with said nuts, jaws 5, carried on the screws, a collar 3, loosely supported on the hub of the chuck and adapted to oscillate levers 8, a ring 14, pivotally supported and in engagement with said collar to adjust it longitudinally for the purpose of acting upon levers 8, a lever 19, connected with one free end to ring 14, a rod 20, connected to the other end of lever 19, a customary feed-mechanism having a reciprocating feed-rack 23, and means to connect rod 20 to the latter whereby the manipulation of ring 14, affects simultaneously levers 8, with jaws 5, and the feed-mechanism.

6. A lathe-chuck, or similar work-holding device, provided with radially movable jaws and pivotally supported levers which operatively connect to said jaws, a collar 3, loosely supported on the hub of the chuck and adapted to oscillate levers 8, a ring 14, pivotally supported and in engagement with said collar to adjust it longitudinally for the purpose of acting upon levers 8, a lever 19, connected with one free end to ring 14, a rod 20, connected to the other end of lever 19, a customary feed-mechanism having a reciprocating feed-rack 23, and means to connect rod 20, to the latter, whereby the manipulation of ring 14, affects simultaneously levers 8, and the feed-mechanism.

In testimony whereof we affix our signatures in presence of two witnesses.

HENRY DRESES.
WILLIAM BARKER.

Witnesses:
C. SPENGEL,
C. FINN.